United States Patent [19]

Mitani et al.

[11] Patent Number: 4,840,471
[45] Date of Patent: Jun. 20, 1989

[54] X-RAY SHIELDED PROJECTION LENS

[75] Inventors: Katsuaki Mitani, Ibaraki; Hideki Ishinaga, Takatsuki, both of Japan

[73] Assignee: Matsushita Electric Industrial Co., Ltd., Kadoma, Japan

[21] Appl. No.: 83,337

[22] Filed: Aug. 10, 1987

[30] Foreign Application Priority Data

Aug. 11, 1986 [JP] Japan ................................ 61-188133
Feb. 20, 1987 [JP] Japan ................................ 62-38404

[51] Int. Cl.⁴ ............................................ G02B 27/00
[52] U.S. Cl. ................................ 350/438; 250/515.1
[58] Field of Search .......................... 350/438; 315/85; 250/515.1

[56] References Cited

U.S. PATENT DOCUMENTS 4,686,417 8/1987 Noji ........................................ 315/85
4,699,477 10/1987 Clarke ................................. 350/432

Primary Examiner—Bruce Y. Arnold
Assistant Examiner—Rebecca D. Gass
Attorney, Agent, or Firm—Cushman, Darby & Cushman

[57] ABSTRACT

A projection lens for projecting the visual image of the cathode ray tube apparatus (CRT) consists of plastic lens elements, at least one glass lens element which absorbs X-rays from the CRT, and a body tube made of plastic material containing X-ray shielding material such as PbO, Zn, BaSO4, Pb-Sn alloy or the like.

10 Claims, 9 Drawing Sheets

X-RAY SHIELDED PROJECTION LENS

FIELD OF THE INVENTION AND RELATED ART STATEMENT

1. Field of the Invention

The present invention relates to a projection lens of video projector for projecting visual images on a cathode ray tube of the video projector to a screen, and especially relates to X-ray shielding of the projection lens for shielding X-ray irradiated from the cathode ray tube.

2. Description of the Related Art

Glass has conventionally been used for the material of almost all accurate optical lenses. Plastic material, however, has become to be used for optical lenses in recent years because of its light weight as a result of improvements of plastic molding techniques or plastic cutting techniques.

Such a plastic lens has been radically adopted to projection lenses of a video projector which needs large-aperture, accurate lens.

When an accident occurs in the video projector for some reason and a high voltage is applied to a cathode ray tube, X-rays are irradiated therefrom, although they are never irradiated in the normal state. In the conventional projection lens which consists of glass lens elements and a metal body tube, the X-rays are absorbed and shielded by optical glass of the lens elements end by metal of the body tube. Therefore, X-rays are not irradiated from the part of the projection lens. The recent projection lens consisting of plastic lens elements and plastic body tube has, however, a demerit of leakage of the X-ray therethrough, because the plastic material can hardly absorb the X-rays. The inventors of the present invention already proposed a projection lens for shielding the X-rays, which is shown in the Published Unexamined Japanese Patent Application No. Sho 61-97617 (Japanese Patent Application No. 59-219708) as related art.

The first related art of the projection lens is described as follows with reference to FIG. 1.

FIG. 1 is a cross-sectional side view showing a related art of the projection lens consists of three lens elements for the video projector, and all the lens elements are made of plastic material.

The projection lens comprises a body tube 1 made by plastic molding and plastic lens elements 2, 3 and 4 which constitute a lens system for projection of an image. The visual image traced on a front phosphor screen 7A of a cathode ray tube apparatus 7 is projected to a screen (not shown in the figure), passing through the lens elements 2, 3 and 4. At the same time, X-rays shown by arrows A, B, C, D and E are irradiated from the cathode ray tube apparatus 7 when an accidental high voltage is applied thereon. Accordingly, such X-rays must be shielded. The body tube 1 is formed in two half pieces divided by a plane which is substantially parallel to the center axis, and the two half pieces are connected in one piece, fixing the lens elements 2, 3 and 4. A glass plate 5 for shielding X-rays is disposed between the lens elements 2 and 3, and the X-rays B, C, D and E are shielded by the glass plate 5. The X-ray A leaks, however, to the outside by passing through the plastic body tube 1. An X-ray shielding cover 6 made of metal plate is disposed outside of the body tube 1 for shielding the X-ray A which is reaking from the body tube 1. A rear cover 8 made of metal plate is disposed rear outside of the cathode ray tube 7 for shielding X-ray irradiated from rear face of the cathode ray tube 7. As mentioned above, the first related art of the projection lens needs the glass plate 5 disposed in the body tube 1 for absorbing (shielding) the X-rays passing through the lens elements and the shielding frame 6 for shielding the leaking X-ray passing through the body tube 1.

The second related art of the projection lens is described as follows with reference to FIG. 2.

The projection lens shown in FIG. 2 comprises a body tube 1, plastic lens elements 2 and 4, and a glass lens element 9. In this case, the incident X-rays to the glass lens element 9 are stopped thereby and are shielded, but the X-rays which pass through the external part of the glass lens element 9 are not shielded. Therefore, an X-ray shielding ring 10 having a center through-hole whose inside diameter is a little smaller than the outside diameter of the glass lens element 9 and whose outside diameter fits in the inside of the body tube 1, is provided for shielding the X-ray passing through the external part of the glass lens element 9. The body tube 1 is made of plastic material, the X-ray A passes through the body tube 1 the same as the abovementioned first related art of the projection lens, and the X-rays F and G leak through the rib part 1a for positioning the glass lens element 9 and the X-ray shielding ring 10.

Accordingly, the second related art of the projection lens needs an X-ray shielding frame 6 made of a metal as same as that of the first related art of the projection lens for shielding the leaking X-ray from the body tube 1.

As mentioned above, in case of using a plastic material for the body tube 1, it is impossible to shield the X-ray passing through the side wall of the body tube 1, dissimilarly to the case of using X-ray shielding materials such as iron, lead, or galvanized steel to the body tube 1. Therefore, the projection lens must be covered by an X-ray shielding cover except the part of the lens front. Nevertheless, a small amount of X-ray may leak through the contact part of the body tube 1 and the X-ray shielding frame 6, and so on, because the adherency or fitting accuracy of the contact part is not perfect. Then a lead (Pb) tape or the like shielding member is adhered to seal the contact part for shielding the small amount X-ray.

The above-mentioned related arts of the projection lens have demerits of expensiveness of press die and parts cost, and complex manufacturing process due to the large number of parts and the like. And further the related arts need repetition of modification of the size or the shape of the X-ray shielding cover to minimize the leakage of the X-ray, because the leakage part of the X-ray can be found by measuring the X-ray only after assembling the projection lens together.

PURPOSE AND SUMMARY OF THE INVENTION

Purpose of the present invention is to provide an improved X-ray shielded projection lens having a plastic body tube.

An X-ray shielded projection lens in accordance with the present invention comprises:

at least one lens element which is made of glass for absorbing X-ray irradiated from a cathode ray tube and is disposed in front of a cathode ray tube apparatus, a body tube made of plastic material containing X-ray shielding substance, having means for positioning the lens element.

By using the X-ray shielding projection lens in accordance with the present invention, all the X-ray from the cathode ray tube can be shielded without using any other external shielding member.

DESCRIPTION OF THE PREFERRED EMBODIMENTS

A preferred embodiment of an X-ray shielded projection lens in accordance with the present invention is described as follows with reference to FIG. 3, FIG. 4 and FIG. 5.

Figure 3:
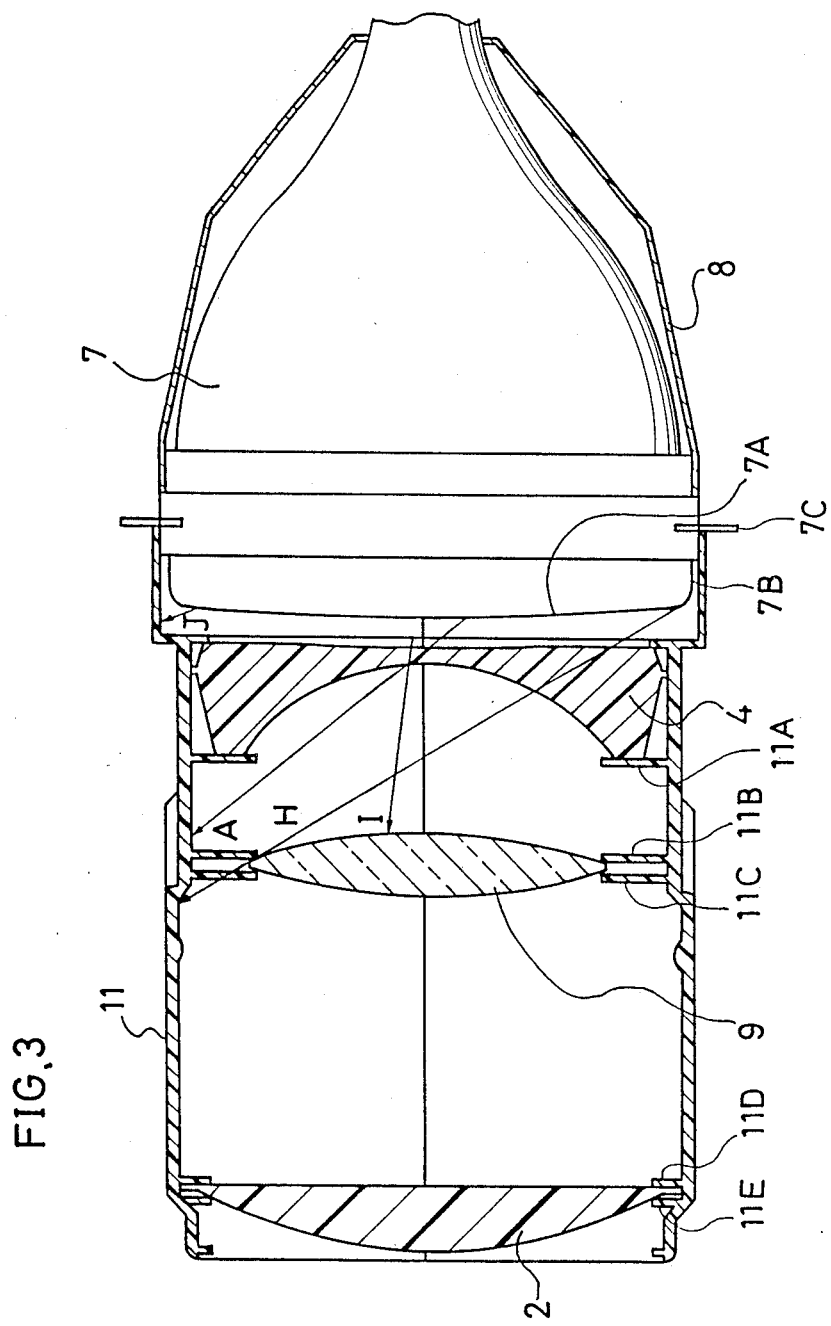
FIG. 3 is a cross-sectional side view showing a preferred embodiment of an X-ray shielded projection lens in accordance with the present invention.

FIG. 3 is a cross-sectional side view showing the constitution of the X-ray shielded projection lens. In this embodiment, the X-ray shielded projection lens comprises plastic lens elements 2 and 4, a glass lens element 9 which can absorb or shield the X-ray, and a body tube 11 which is for holding the above-mentioned lens elements and is made of plastic material for shielding X-ray so as not to leak outside. The plastic material of the body tube 11 contains X-ray shielding materials such as lead compound, barium compound, strontium compound, titanium compound, zirconium-oxide compound, Pb-Sn alloy, heavy metals of zinc and the like, inorganic material and the like for having necessary attenuation factor so as to shield the X-ray from the cathode ray tube apparatus. The projection lens consists of the plastic lens elements 2 and 4, the glass lens element 9 and the plastic body tube 11, and the projection lens is fixed on the panel 7C of the cathode ray tube apparatus 7.

In case of using such X-ray shielded projection lens to a video projection television set, an X-ray shielding material having X-ray shielding characteristic similar to at least that of conventional iron sheet or galvanized steel is necessary to shield the X-ray irradiated at application of high-voltage to the cathode ray tube apparatus.

Figure 4:
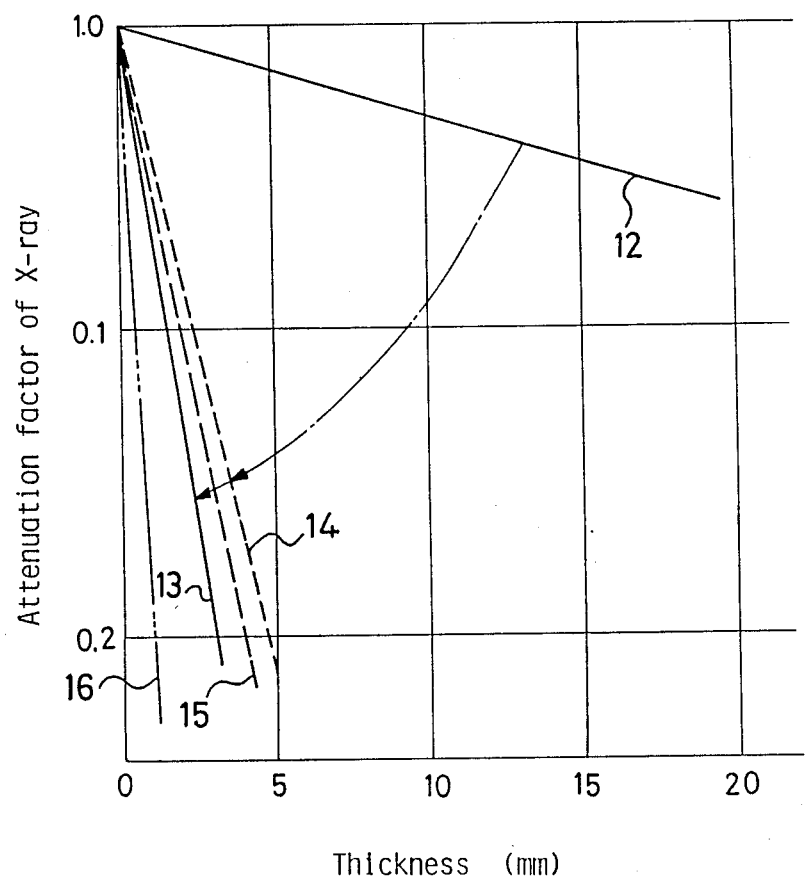
FIG. 4 is a characteristic diagram showing the relation between the attenuation factors of the X-ray and the thickness of the materials of the body tube.
Figure 5:
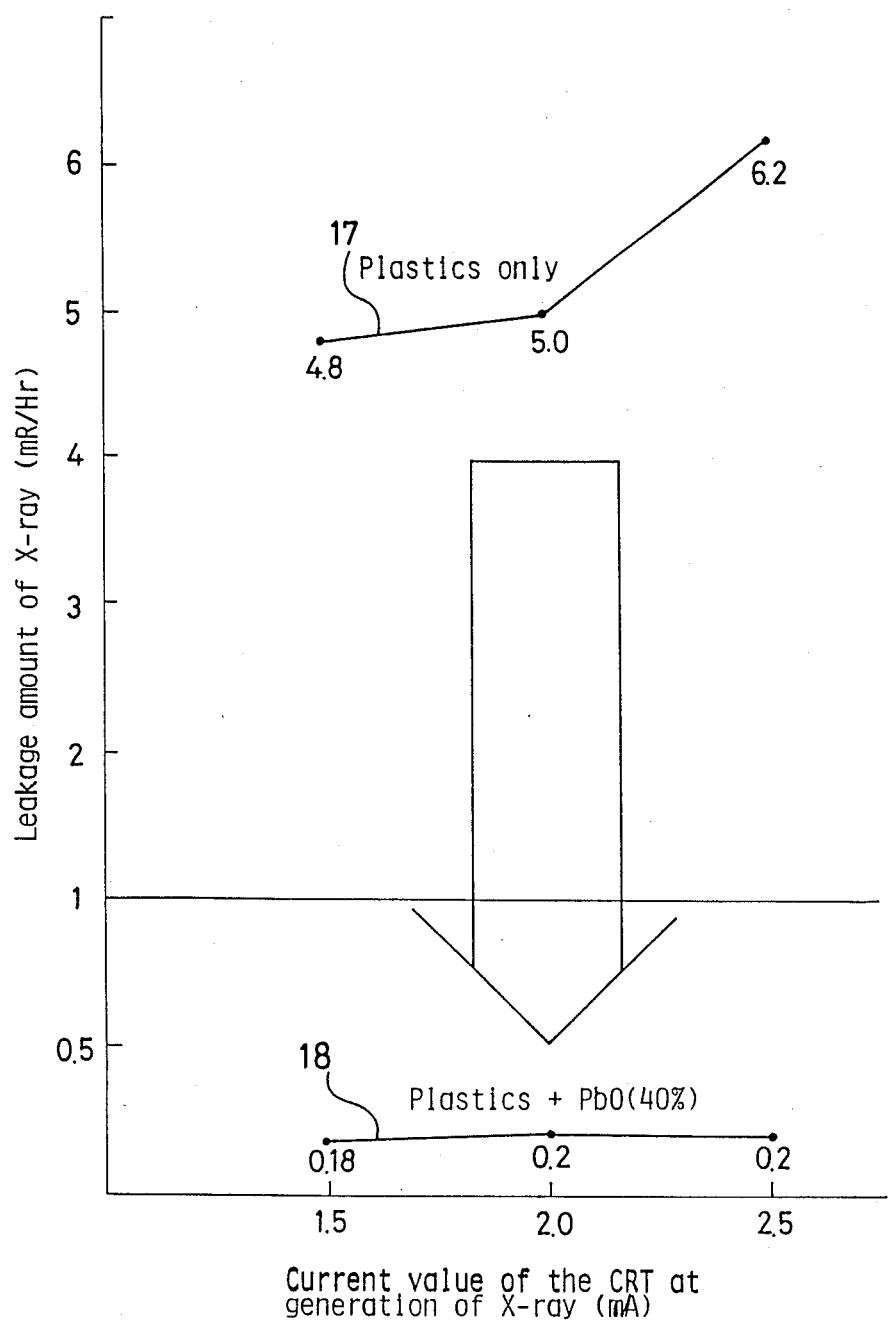
FIG. 5 is a characteristic diagram showing the relation between the leakage amount of the X-ray and the current value of cathode ray tube apparatus.

In case of containing X-ray shielding material, for example, about forty percent (40%) of lead compound PbO in a plastic material, the X-ray attenuation factor is shown by a line 13 in FIG. 4, which is greatly improved in comparison with the case of only the plastic material, and improved over the attenuation line 15 of an optical glass material SK-5 which is widely used for lens. And in case of containing about forty percent (40%) of barium compound $BaSO_4$ in the plastic material, the X-ray attenuation factor 14 is close to but a little inferior to that of the glass material Sk-5. Still the X-ray attenuation factor 14 is greatly improved than that of the case of only the plastic material.

The above-mentioned materials were used for forming the actual body tube 11 and the X-ray shielded projection lens with the body tube 11 was positioned at the front part of a cathode ray tube apparatus. Then, when the amount of leakage X-ray outside the X-ray shielded projection lens was measured, wherein the test was practiced using a body tube having thickness of 2.5 mm. The amount of the leakage X-ray outside the body tube 11 of plastic material containing PbO was in the range of 0.18-0.2 mR/Hr as shown by the line 18 in FIG. 5, and it was greatly improved over the safety standard value of below 0.5 mR/Hr, compared with that of the characteristic of the numeral 17 corresponding to the body tube made of only the plastic material.

In the above-mentioned case of using PbO, the X-ray attenuation factor and prevention of leakage of the X-ray similar to those of ordinary optical glass can be obtained by containing the PbO of about forty percent (40%). When other X-ray shielding material than PbO, such as other lead compound, barium compound or strontium compound are used for X-ray shielding material, the necessary amount thereof must be determined by examining the X-ray attenuation factor and amount of leakage X-rays.

In order to perfectly shield the X-ray from the cathode ray tube apparatus by using the projection lens, it is necessary and important to overlap all of the front face 7A and side face 7B of the cathode ray tube apparatus 7 by the body tube 11 made of plastic material containing X-ray shielding material and by the glass lens element 9. Accordingly, the plastic lens elements 2 and 4 and the glass lens element 9 are positioned by ring-shaped ribs 11A, 11B, 11C, 11D and 11E, which are made integral with the body tube 11 made of the plastic material containing the X-ray shielding material. Therefore, even obliquely travelling X-ray such as the X-ray H is shielded by the ribs, because the gap parts between the lens elements 2, 4 and 9 and the body tube 11, are covered by these ribs. The near axis X-ray I which passes through the lens element 4 is absorbed (shielded) by the glass lens element 9. The oblique X-ray A is shielded by the side wall of the body tube 11. The X-ray J which is emitted from peripheral part of the face plate directly in oblique direction without passing through any lens element is shielded by the side wall of the body tube 11 for covering the front phosphor screen of the cathode ray tube apparatus 7. The rear surface of the cathode ray tube apparatus 7 is shielded by an iron cover 8 similar as in the related art.

Another preferred embodiment of the X-ray shielded projection lens in accordance with the present invention is described as follows with reference to FIG. 6, FIG. 7, FIG. 8 and FIG. 9.

Figure 6:
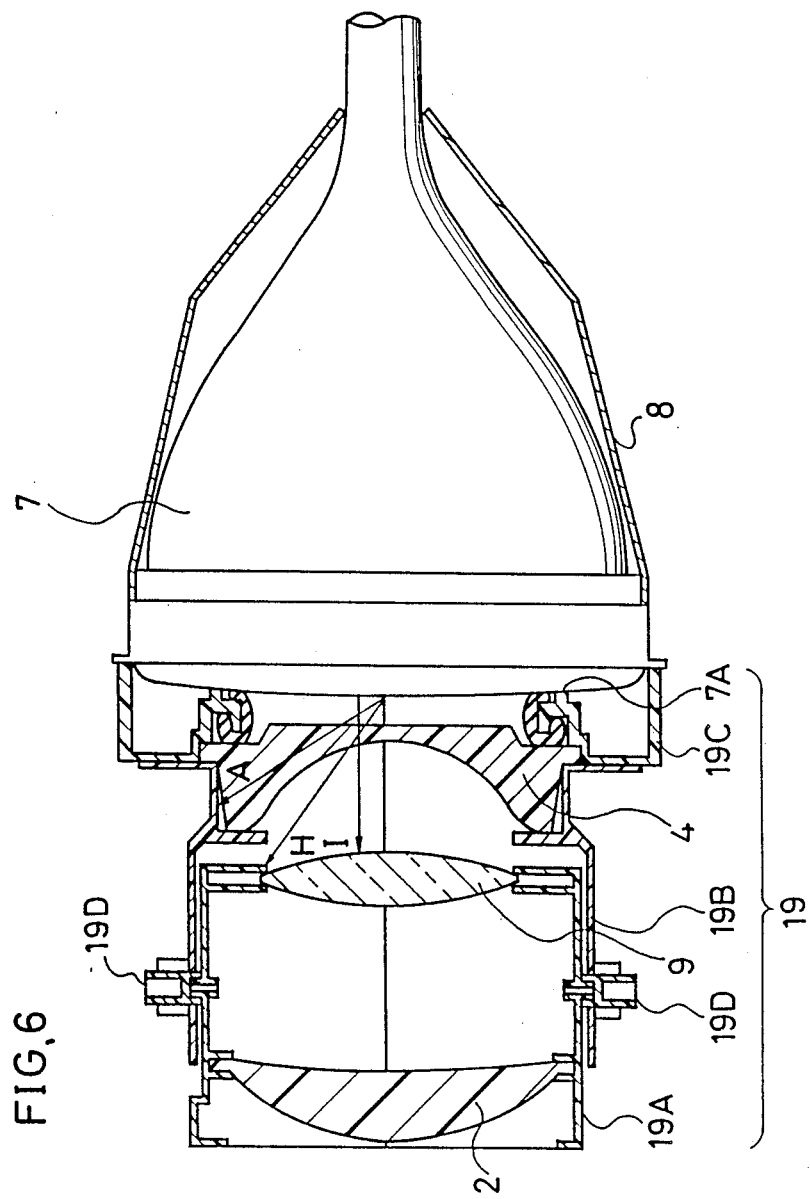
FIG. 6 is a cross-sectional side view showing another preferred embodiment of an X-ray shielded projection lens in accordance with the present invention.

In FIG. 6, an inner sleeve 19A of body tube 19 holds the plastic lens element 2 and the glass lens element 9 at predetermined positions, respectively. An outer sleeve 19B of the body tube 19 holds the plastic lens element 4 at a predetermined position. A lens positioning sleeve 19C fixes the projection lens to the front of the cathode ray tube 7, and connecting members 19D connect the inner sleeve 19A and the outer sleeve 19B with each other. Such inner sleeve 19A, outer sleeve 19B and lens positioning sleeve 19C are the constituents of the body tube 19 of the projection lens made of plastic material containing X-ray shielding material, and shields the X-ray so as not to leak outside the projection lens. The projection lens consists of the plastic lens elements 2 and 4, the glass lens element 9 and the body tube 19. The plastic material used for the inner sleeve 19A, the outer sleeve 19B and the lens positioning sleeve 19C contains the X-ray shielding material such as lead compound, barium compound, strontium compound, titanium compound, zirconium-oxide compound, Pb-Sn alloy, heavy metals of zinc, inorganic material and the like for giving necessary attenuation factor to shield the X-ray from the cathode ray tube apparatus. And at least all the front surface of the cathode ray tube apparatus is covered by the X-ray shielded projection lens so as not to leak the X-ray generated by the cathode ray apparatus.

Figure 7:
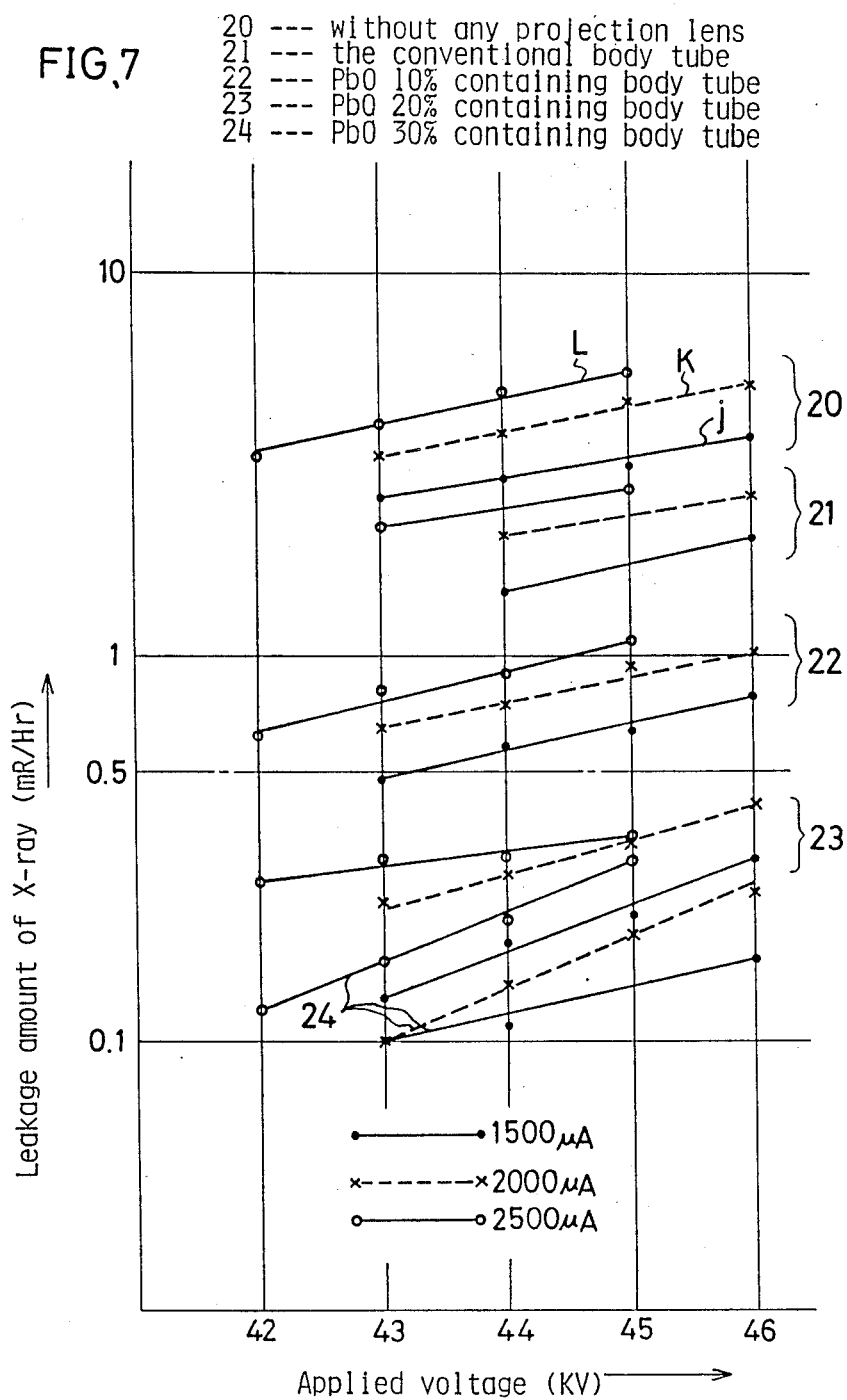
FIG. 7 is a characteristic diagram showing the relations between the leakage amount of the X-ray and the applied potential to a cathode ray tube apparatus.

In television set of the video projector, the electric circuit is different from their sizes or kinds and the X-rays which are generated by applying high-voltage on the cathode ray tube apparatus varies in relation to the electric circuits. Therefore, the high-voltage to be applied accidentally to the cathode ray tube apparatus is not uniform, but it can ordinary be seen in the range of 45–46 KV. In respect of the amount of the X-ray, the larger the current flow in the cathode ray tube, as well as the higher the applied potential becomes, the larger the amount of generated X-ray is, as shown by the J, K, and L lines of the case 20 in FIG. 7, which are the characteristics of the relation between the current values 1500 μA, 2000 μA and 2500 μA, respectively, under a voltage from 42 KV to 46 KV and without any projection lens. Then, the plastic materials which contains PbO of ten percent (10%), twenty percent (20%), and thirty percent (30%), respectively, as the X-ray shielding materials, were used for the inner sleeve 19A, the outer sleeve 19B and the lens positioning sleeve 19C, wherein thickness of respective sleeves were 2.5 mm, and the leakage of the X-ray was measured. The result was shown by lines of the groups 22, 23 and 24 in FIG. 7. Hereupon, the lines 22 shows the result of the case containing 10% PbO, the numeral 23 shows the result of the case containing 20% PbO and the numeral 24 shows the result of the case containing 30% PbO. FIG. 7 shows that the leakage amount of the X-ray is lower than 0.5 mR/Hr, when containing the PbO over 20%. But for that matter, when the contained PbO was 10%, the leakage amount of the X-ray was below the 0.5 mR/Hr when the current value was 1500 μA and the applied voltage was below 43 KV.

Figure 1:
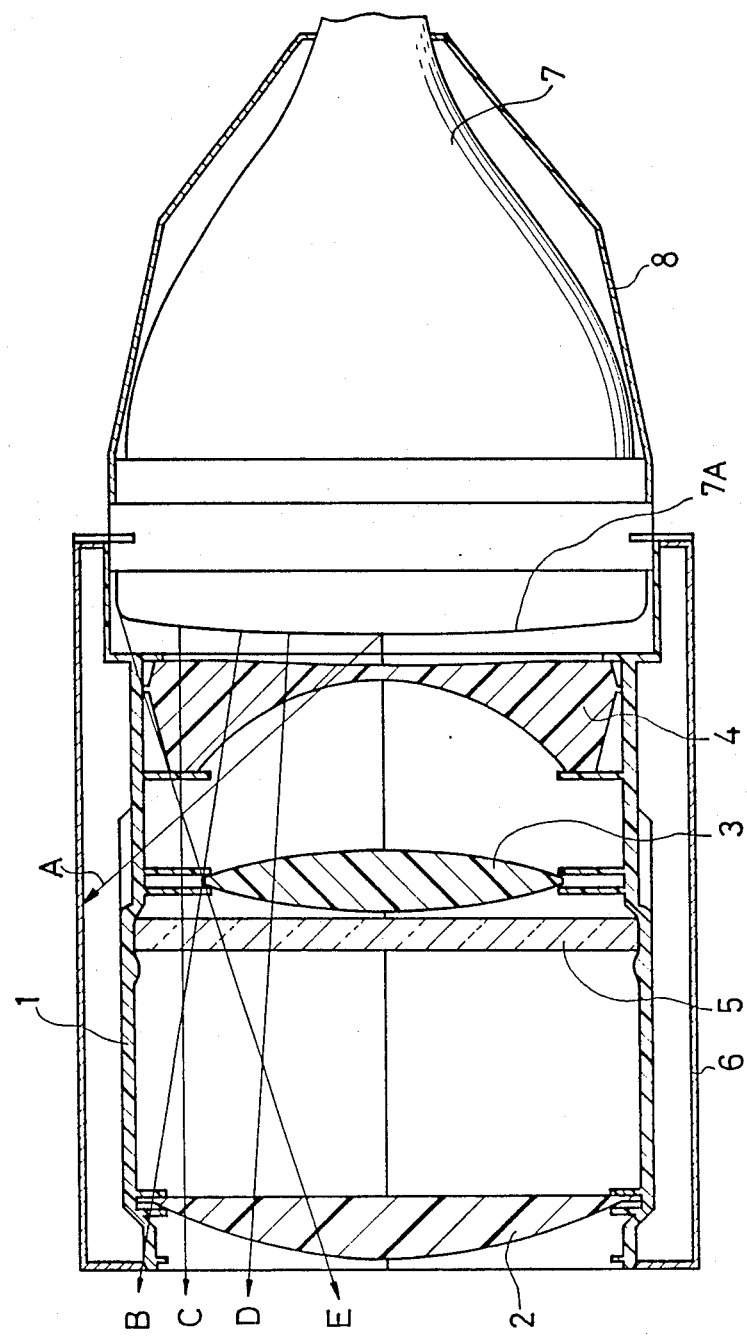
FIG. 1 is the cross-sectional side view showing the first related art of the projection lens.
Figure 2:
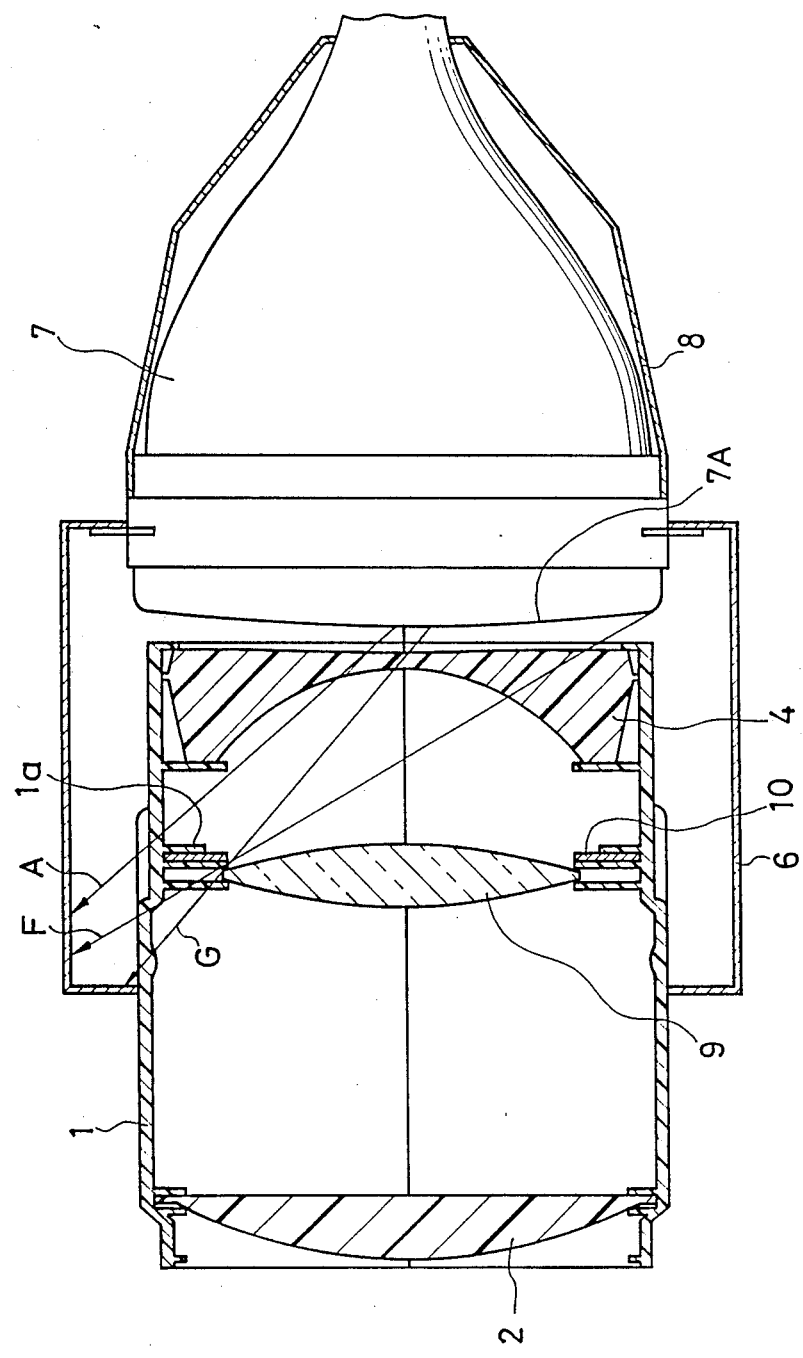
FIG. 2 is the cross-sectional side view showing the second related art of the projection lens.

In FIG. 7, the group 20 shows the result of the cases without any projection lens and the numeral 21 shows the result of the case using the conventional projection lens having plastic body tube containing no X-ray shielding material shown in FIG. 1. Such data show the necessity of a metal frame for X-ray shielding.

Figure 8:
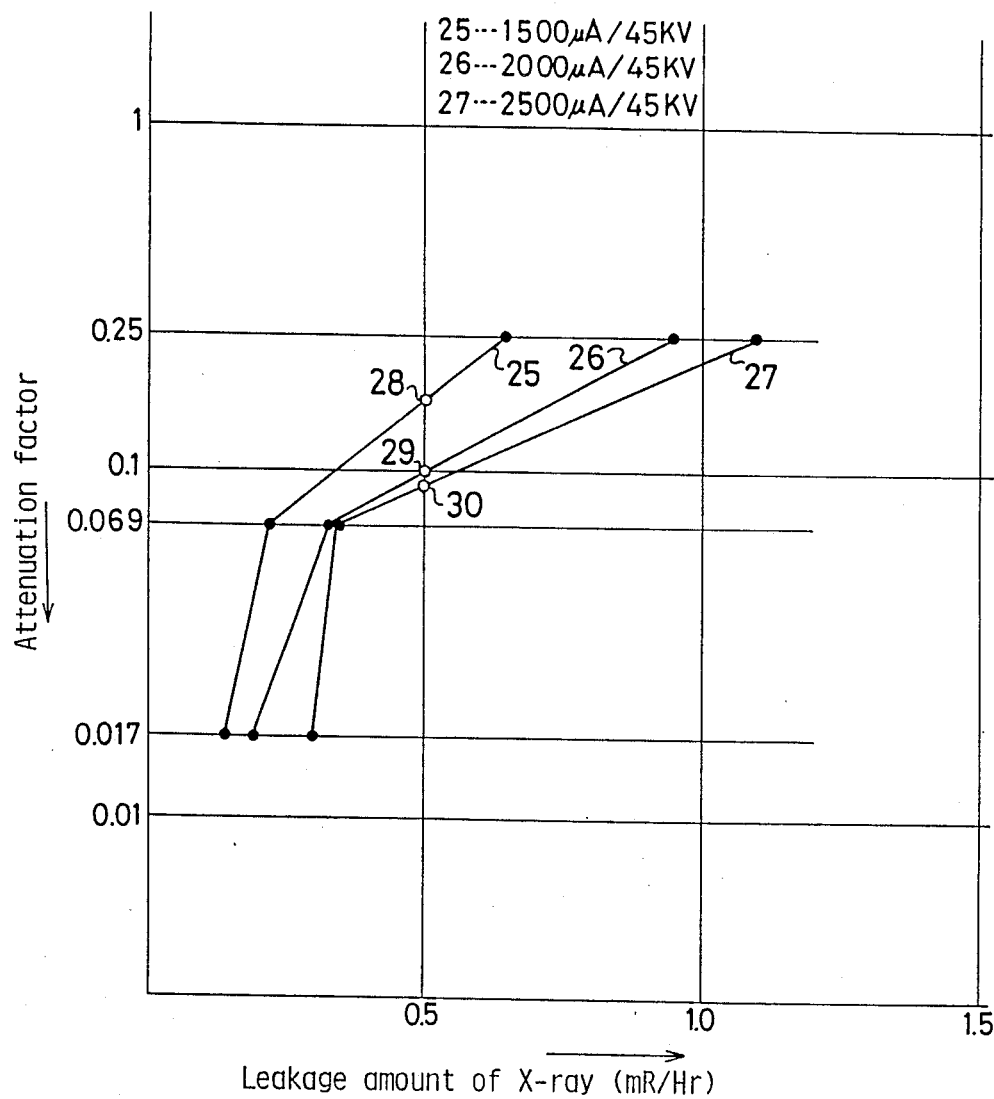
FIG. 8 is a characteristic diagram showing the relations between the attenuation factor and the leakage amount of the X-ray.
Figure 9:
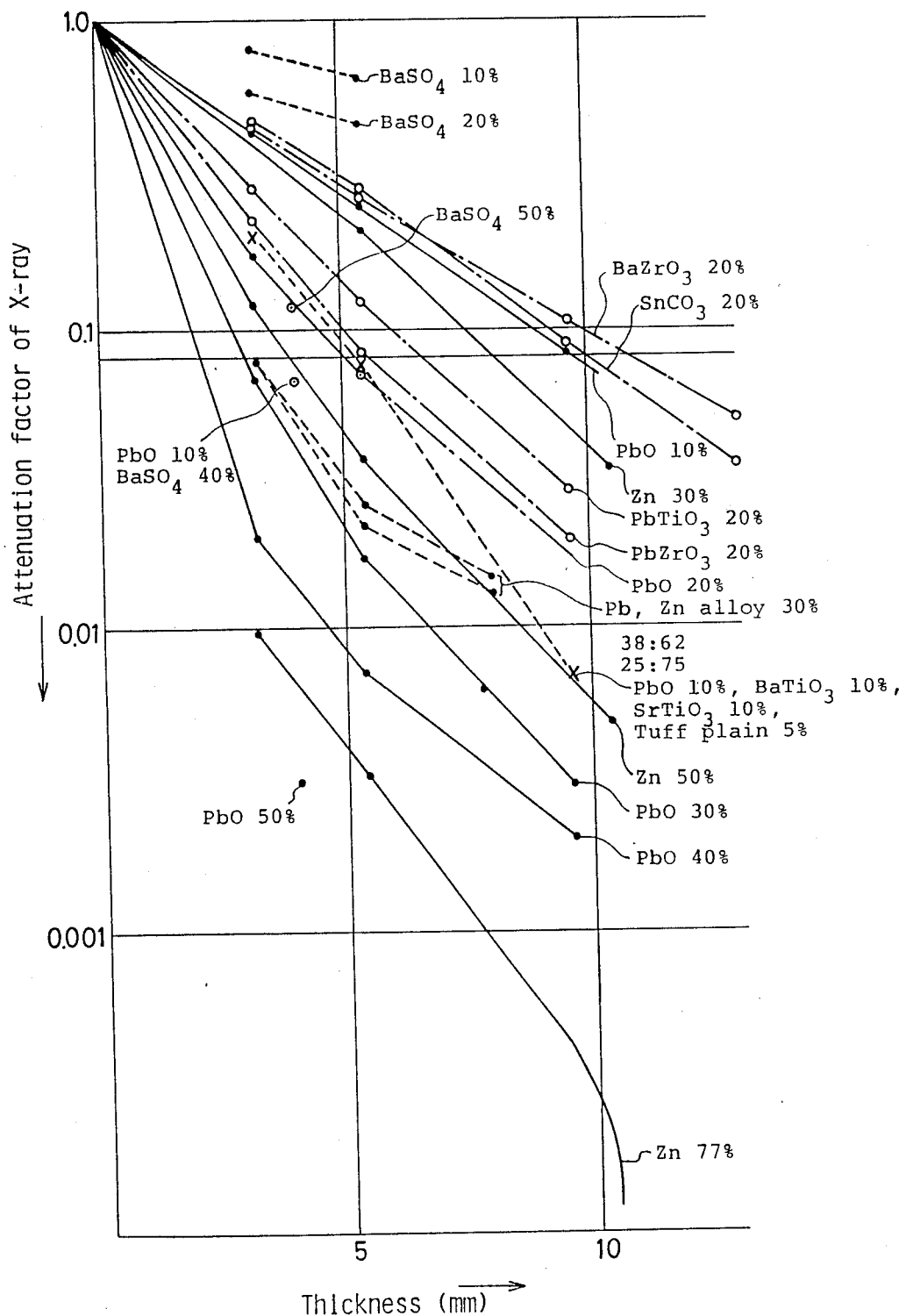
FIG. 9 is a characteristic diagram showing the relations between the attenuation factor of the X-ray and the thickness of the body tube.

In order to make the leakage amount of the X-ray below 0.5 mR/Hr, the X-ray shielding material as well as its amount to be contained in the plastic material shall be selected with reference to the relation between the leakage amount and the attenuation factor of the X-ray. The measurement data of the relations between the leakage amount and the attenuation factor of the X-ray are shown in FIG. 8.

Necessary attenuation factor for achieving a target of the leakage amount being below 0.5 mR/Hr in case of the thickness of the body tube was 5 mm (hereupon, the thickness of the inner sleeve was 2.5 mm and that of the outer sleeve was 2.5 mm) was:

less than the value 0.16 shown by a white dot 28 on the line 25 when the current flow was 1500 μA and the voltage was 45 KV;

less than the value 0.098 shown by a white dot 29 on the line 26 when the current flow was 2000 μA and the voltage was 45 KV; or less than the value 0.09 shown by a white dot 30 on the line 27 of when the current flow was 2500 μA and voltage was 45 KV.

With reference to the above-mentioned relations between the leakage amount and the attenuation factor of the X-ray, the attenuation factors are measured for several thickness, for plural plastic materials and for various X-ray shielding materials, such as $BaSO_4$, $BaZO_3$, $SrCO_3$, Zn, Pb-Sn alloy, other heavy metals, metals, inorganic matters or their complex mixture, for various content ratios thereof. The measured attenuation characteristic curves showing the relations between the content ratio of the X-ray shielding material and the thickness of the materials are drawn, as shown, for example, in FIG. 9. The material to be used for the body tube of the projection lens for the projection television set is selected by deciding the voltage value and the current flow value of the cathode ray tube apparatus.

For example, in case that the voltage is 45 KV and the current is 2500 μA, an usable plastic material containing X-ray shielding material can be found as a range having, an attenuation factor below the point of 0.09 of the white dot 30 of the curve 27 of FIG. 8 (cross pint of 0.5 mR/Hr of the leakage amount and the attenuation characteristic curve 27 of 2700 μA the current and 45 KV voltage). That is, the usable plastic materials are those which contain PbO 20%, Zn 50%, $BaSO_4$ 50%, PbO 10%, $BaSO_4$ 40%, Pb-Sn alloy 30%, PbO 30%, and which have the attenuation factor below 0.09 on the vertical line of thickness 5 mm (because the total thickness of the inner and outer sleeves is 5 mm).

For materials having lower attenuation factors than the above-mentioned materials, such as $PbZrO_3$ 20%, $PbTiO_3$ 20%, Zn 30%, PbO 10%, $DaZrO_3$ 20%, $SrCO_3$ 20% or the like, they can be used by selecting the thickness appropriately thick so as to make the attenuation factor below the cross points of respective curves with horizontal attenuation factor line of 0.09. For example, in case of using the material containing $PbTiO_3$ 20%, the necessary thickness is over 0.5 mm. And in case of using the material containing 30% Zn, the thickness is to be made over 8 mm. Furthermore, in case that the thickness can not be made under 5 mm due to any problem of the design, a material of higher attenuation factor whose curve lies below the horizontal line of the attenuation factor 0.09 for the thickness limited by the design is to be selected.

In other cases which are different from the above-mentioned case at points of the voltage or the current value (the case of the voltage is 46 KV and the current value is 2000 μA or the case of the voltage is 43 KV and the current value is 1500 μA or the like), the X-ray which is irradiated by applying such voltage and current flow on the cathode ray tube apparatus can be shielded by combining the thickness of the body tube and the attenuation factor of content X-ray shielding material.

And the above-mentioned data of the content ratios and the attenuation factors of the X-ray shielding materials are limited only to the working examples. There are many other X-ray shielding materials, and for other materials than mentioned above, it is important to make characteristic curves between the leakage amount and the attenuation of the X-ray shielding materials to be contained in the plastic tube body, in accordance with the purpose.

As shown in FIG. 6, the plastic lens elements 2 and 4 and the glass lens element 9 are respectively fixed by ring shaped ribs formed integral of the plastic body tube with the X-ray shielding material, and therefore, even the oblique X-rays, such as the X-ray H is shielded by the ring shaped rib by making the lens elements, and the body tube does not have any gap through which X-rays can leak. The near axis X-ray I is absorbed (shielded) by the glass lens element 9. The most oblique X-ray A is shielded by the side wall of the outer sleeve 19B.

By the way, the lens positioning sleeve 19C is fixed on the cathode ray tube apparatus by screw (not shown), the outer sleeve 19B is fixed on the lens positioning sleeve 19C by the screw (not shown) and the inner sleeve 19A is partially fit into and fixed on the outer sleeve 19B using the fixing members 19D and by the screw (not shown).

What is claimed is:

1. An X-ray shielded projection lens mounted in front of a cathode ray tube apparatus, said projection lens comprising:
    at least one lens element which is made of glass for absorbing X-rays irradiated from said cathode ray tube apparatus; and
    a body tube made of a plastic material containing X-ray shielding material, and having a cover portion for encasing the entire front portion of said cathode ray tube apparatus so as to cover a gap defined between said cathode ray tube apparatus and said at least one lens element and thereby to prevent leakage of X-rays through said gap, and lens element positioning means for positioning each said at least one lens element at a predetermined position relative to the front of said cathode ray tube apparatus.

2. An X-ray shielded projection lens in accordance with claim 1, wherein
    said plastic material of said body tube contains an amount of X-ray shielded material so that the amount of X-ray leakage from said body tube is less than 0.5 mR/Hr.

3. An X-ray shielded projection lens in accordance with claim 2, wherein
    said plastic material for making said body tube contains at least one X-ray shielding material selected from the group consisting of lead compound, barium compound, strontium compound, titanium compound, zirconium-oxide compound, zinc compound, Pb-Sn alloy, and PbO.

4. An X-ray shielded projection lens in accordance with claim 2, wherein
    said X-ray shielding material is mixed in said plastic material so as to make the attenuation factor of said body tube against X-rays less than 0.09.

5. An X-ray shielded projection lens in accordance with claim 1, wherein
    said plastic material for making said body tube contains at least one X-ray shielding material selected from the group consisting of lead compound, barium compound, strontium compound, titanium compound, zirconium-oxide compound, zinc, Pb-Sn alloy and PbO.

6. An X-ray shielded projection lens in accordance with claim 1, wherein
    said X-ray shielding material is mixed in said plastic material so as to make the attenuation factor of said body tube against X-rays less than 0.09.

7. An X-ray shielded projection lens mounted in front of a cathode ray tube apparatus, said projection lens comprising:
    at least one lens element for projecting visual images on a front screen of said cathode ray tube to a screen at a predetermined position, one of said at least one lens element being made of glass for absorbing X-rays irradiated from said cathode ray tube apparatus;
    a positioning member made of X-ray shielding material and fixedly mounted to said cathode ray tube apparatus for enclosing the periphery of the front of said cathode ray tube apparatus;
    a fixed tube made of X-ray shielding material formed integrally with and fixedly mounted to said positioning member for shielding X-rays obliquely irradiated from said cathode ray tube apparatus;
    a movable tube made of X-ray shielding material engaged with said fixed tube and holding at least of one of said at least one lens element, said movable tube being movable for selectively focusing said lens element;
    at least one connection member made of X-ray shielding material for fixing said movable tube on said fixed tube and for preventing X-rays from leaking from a gap between said movable tube and said fixed tube.

8. An X-ray shielding projection lens in accordance with claim 7, wherein said X-ray shielding materials are plastic materials containing at least one powder selected from the group consisting of lead compound, barium compound, strontium compound, titanium compound, zirconium-oxide compound, zinc compound, Pb-Sn alloy, and PbO.

9. An X-ray shielding projection lens in accordance with claim 8, wherein said X-ray shielding materials contain an amount of said powder so that the amount of X-ray leakage from said positioning member, said fixed tube, said movable tube, and said connection member is less than 0.5 mR/Hr.

10. An X-ray shielding projection lens in accordance with claim 8, wherein
    said plastic material is mixed with an amount of said powder so as to make the attenuation factor thereof against X-rays less than 0.09.

* * * * *